3,769,417
BIOCIDAL POLYMERIC COMPOSITIONS FOR CONTROLLING INVERTEBRATE PESTS
Adriaan W. van Breen, Delft, Netherlands, assignor to Shell Oil Company, New York, N.Y.
No Drawing. Filed May 12, 1971, Ser. No. 142,736
Claims priority, application Great Britain, May 21, 1970, 24,634/70
Int. Cl. A01n 9/36
U.S. Cl. 424—78                              7 Claims

ABSTRACT OF THE DISCLOSURE

Slow release biocidal generators having improved biocide release characteristics comprise a volatile liquid beta-halovinyl phosphate biocide dispersed in a heterogeneous thermoplastic polymeric mixture comprising an ethylene-vinyl acetate copolymer and a polymer selected from the group consisting of polyvinyl chloride, polystyrene and a block copolymer of a conjugated diene with a mono-alpha-alkenyl arene.

---

This invention relates to slow release biocidal compositions comprising a volatile beta-halovinyl phosphate biocide dispersed in a blend of polymeric materials capable of being formed into various geometric configurations, said compositions having controlled release rates of the biocide therefrom.

Certain halogenated vinyl phosphates are now well known as biocides particularly as invertebrate pesticides. These compositions are functional as general poisons on contact, by ingestion or by inhalation. Such biocides, for example, are disclosed in U.S. Pat. 2,956,073. Because of their efficacy they are used as sprays, dusts, baits and in controlled release vapor generators such as disclosed and taught in U.S. Pat. 3,318,769. This patent discloses that volatile phosphate biocides may be dispersed in thermoplastic resins such as polyvinyl chloride and can be formulated together with certain plasticizers as slow release generators. For slow release application, the generator ideally releases only enough biocide into an enclosed environment to kill or control certain invertebrate pests in or coming into that environment and at a rate sufficiently low that it is non-toxic to other forms of life such as warm-blooded animals.

Slow release generators made from the above-materials are known to gradually release the biocide into the surrounding atmosphere for a period of several months. A disadvantage of these prior art generators, however, is that there is an initial high rate of release of biocide from the generator compared to the rate of release at the end of a predetermined period, e.g., three months. While such formulations permit the biocides to be used effectively yet safely, the rate of release is such as results in a waste of biocide. The high initial rate is unnecessary to the control of insects and the vaporous biocide can be lost physically from a space to be treated and also lost chemically by decomposition caused by moisture. Therefore, at the onset and for some time thereafter, the prior art formulations may emit considerably more of the biocide than is necessary. Not only does this subject the biocide to unnecessary loss, but materially reduces the effective life of the formulation. Moreover, the rate of diffusion of biocide from the generator falls to an unacceptably low point long before the biocide is depleted from the resin matrix. In other words, the biocide emission patterns for such formulations follow essentially an exponential curve with the relatively high emission rate at the outset falling to a relatively constant lower rate.

Ideally a constant rate of biocide emission throughout the useful life of the generator would be desirable. This means that the exponentiality (E), which is defined as the ratio of the initial (R$i$) release rate to the final (R$f$) release rate

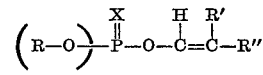

would be 1 since the release rates R$i$ and R$f$ would be the same. While an exponentiality of 1 may not be obtained it follows that the lower the exponentiality is the more ideal the generator becomes.

It is also evident that the more efficient generators provide for a greater degree of exhaustion of biocide from the resin matrix during the useful life of the generator. The degree of depletion of biocide from the generator during its useful life is measured by the weight loss of biocide from the generator between the period of measurement of R$i$ and R$f$. Such weight loss is designated as cumulative weight loss (CW).

From the above it follows that the lower the exponentiality (E) and the higher the cumulative weight loss (CW) the more desirable the slow release generator becomes. This, of course, assumes that the ratio of release R$i$ and R$f$ are such as to effectively control invertebrate pests but sufficiently low that there is no danger of toxicity to other forms of life.

Now, in accordance with the present invention, biocidal compositions are provided comprising a normally volatile liquid beta-halovinyl phosphate dispersed in a combination of polymers, one of which is an ethylene/vinyl acetate copolymer and the other of which is one or more selected from the group consisting of polystyrene, plasticized polyvinyl chloride and a mono-alpha-alkenyl-arene/conjugated diene block copolymer. It has been found that the exponentiality is decreased and the cumulative weight loss increased when using the combination of polymers as compared with similar compositions in which only one polymer is used.

The biocidal materials with which this invention is primarily concerned can be generally described as normally liquid halogenated vinyl phosphates biocides which are relatively volatile at ambient temperatures. Preferred relatively volatile phosphates have the following structures:

$$\left(R-O\right)_2 \overset{X}{\underset{\|}{P}}-O-\overset{H}{\underset{|}{C}}=\overset{R'}{\underset{|}{C}}-R''$$

wherein R represents a methyl or ethyl group, X is O or S, R' is hydrogen or halogen and R" is halogen, which may be chlorine, fluorine, or bromine and preferably chlorine.

Typical species of these compounds include:

Dimethyl 2,2-dichlorovinyl phosphate;
Dimethyl 2,2-dichlorovinyl phosphorothionate;
Diethyl 2-chlorovinyl phosphate;
Dimethyl-2-chlorovinyl phosphate;
Diethyl 2,2-dichlorovinyl phosphate;
Diethyl 2,2-dichlorovinyl phosphorothionate;
Dimethyl 2,2-dibromovinyl phosphate;
Dimethyl 2-bromovinylphosphate;
Diethyl 2,2-dibromovinyl phosphate;
Diethyl 2-bromovinyl phosphate;
Dimethyl 2,2-difluorovinyl phosphate;
Diethyl 2-fluorovinyl phosphate;
Dimethyl 2-chloro-2-fluorovinyl phosphate;
Dimethyl 2-chloro-2-fluorovinylphosphorothionate.

Preferred are those compounds wherein X is O, R' is H or chlorine and R" is chlorine.

Since the above compounds are capable of existing as optical isomers this invention includes such separate isomers or racemic mixtures of isomers.

The ethylene-vinyl acetate copolymers which are to be used in the compositions of the invention correspond to the general formula

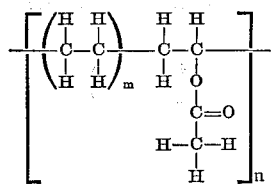

wherein $n$ ranges from about 15 to about 250. The actual occurrence of the acetate substituents along the hydrocarbon chain is of a random character and thus the letter $m$ denotes the average number of ethylene units per vinyl acetate unit in the molecule rather than the presence of regularly recurrent units having the composition given within the above brackets. The value for $m$ ranges from about 1 to 30 and preferably from about 2 to 17. In other words, the vinyl acetate portion of the copolymer comprises about 10 to 75% weight and preferably about 15 to 60% weight based on the total copolymer. Typical properties of ethylene-vinyl acetate copolymers which may be used in the invention are shown in Table I.

TABLE I.—Ethylene vinyl acetate copolymers

| Percent wt. vinyl acetate: | Melt index (dg./min.) |
| --- | --- |
| 33 | 25 |
| 18 | 2.5 |
| 28 | 6 |
| 24 | 20 |
| 28 | 5 |
| 28 | 20 |
| 18 | 20 |
| 28 | 1 |

The volatile phosphate biocides are very soluble in ploystyrene and any of various commercially available polystyrenes may be used.

The vinyl chloride resins comprising one of the several classes of polymers which may be mixed with the ethylene-vinyl acetate copolymer in which the biocides described above are to be dispersed in accordance with this invention may be either homopolymeric polyvinyl chloride or its copolymers. These include vinyl chloride-vinyl acetate copolymers, vinyl chloride-vinylidene chloride polymers, vinyl chloride-fumarate copolymers, vinyl chloride-maleate copolymers, vinyl chloride-acrylic ester copolymers, vinyl chloride-acrylonitrile copolymers, vinyl chloride-alkylvinyl ether copolymers and vinyl chloride-olefin copolymers.

The vinyl chloride resins is plasticized with from 5 to 40% w. basis total composition of either a suitable pesticidally inert ester or one of the biocides mentioned above. While the vinyl phosphate biocides alone function as a plasticizer for PVC, it is generally desirable, but not necessary, for the resin to also contain a pesticidally inert plasticizer. Sutaible pesticidally inert esters which may be used as plasticizers include the triaryl phosphates, such as tricesyl phosphate, triphenyl phosphate, tri(p-tert-butylphenyl) phosphate, tri(biphenylyl) phosphtae, o-biphenylyl diphenyl phosphate, and cresyl diphenyl phosphate; the trialkyl phosphates, such as tri-n-butyl phosphate, tri-2-ethyl-hexyl phosphate, tri-n-octyl phosphate and trilauryl phosphate; and such mixed phosphates as 2-ethylhexyl diphenyl phosphate and the like. These compounds may be generally described by the structure

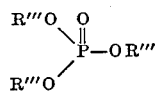

where $R'''$ is a hydrocarbon radical selected from the group consisting of alkyl, aryl, aralkyl, and alkaryl preferably having at least four carbon atoms. These esters are virtually non-volatile but impart excellent plasticized properties to the resulting composition. Because of their similar composition, they are readily compatible with the pesticides in the resin compositions.

Other suitable materials, which are effective for plasticizing the resin and are comparatively non-volatile and pesticidally inert, include phthalate esters, such as dioctyl phthalate, diphenyl phthalate, dicyclohexyl phthalate, dimethyl phthalate and the dihexyl phthalates; the sebacates, such as dipentyl sebacate, n-butyl benzyl sebacate and dibenzyl sebacate; and the adipates, such as dioctyl adipate, dicapryl adipate, diisobutyl adipate, and dinonyl adipate. Other compatible plasticizers, such as the hydrocarbon resinous plasticizers exemplified by hydrogenated polyphenyls and alkylated aromatic hydrocarbon, and polyester plasticizers, e.g., polyesters of such polyols as hexanediol and such polycarboxylic acids as sebacic and adipic acid having molecular weights of about 2000, may also be used.

The block copolymers may be either linear or branched in their configurations. While molecular weight does not form an essential aspect of the present invention, the usual molecular weight range is between about 20,000 and 500,000, normally between about 30,000 and 150,000.

The block copolymers especially useful in the present compositions are block copolymers of conjugated dienes with mono-alpha-alkenyl arenes as well as the hydrogenated derivatives thereof including block copolymers in which alpha monoolefin polymer blocks may be used in place of or in addition to hydrogenated diene blocks. Normally these will have at least one block A comprising a mono-alpha-alkenyl arene polymer block or its hydrogenated derivative and at least one block B comprising a conjugated diene polymer block hydrogenated derivative or the poly (alpha-monoolefin) equivalent of the latter. Where, in the specification and claims, reference is made to hydrogenated conjugated diene polymer blocks, this will be understood to include equivalent poly(alpha-monoolefin) blocks as well.

Preferably, the block copolymers have the general configuration selected from the group A-B-(A)$_x$, A-B-(B-A)$_y$ or A-(B-A)$_y$ wherein each A and B is as defined above, $x$ is 0 or 1 and $y$ is an integer from 2 to 5 (preferably 2 or 3). Wherever adjacent polymer blocks are substantially identical, e.g., B-B, they are to be regarded as a single polymer block. The block copolymers may be either linear or branched in their configuration and are made by processes already known in the art of polymerization such as by solution polymerization involving lithium initiators. The proportion of A or B blocks in the block copolymer does not constitute an essential aspect of the present invention; however, where high impact or elastomeric properties are to be imparted to the composition, it is preferred that the block copolymer contain at least 50 wt. percent of elastomeric copolymer (B) blocks. However, block copolymers having more than 50% of the thermoplastic block, i.e., A blocks, are operable in the present compositions.

The monomers from which the blocks A may be formed are typified by styrene or alkylated styrene, especially alpha-methyl styrene. The conjugated dienes are represented by butadiene and isoprene as well as their homologs going up to about 8 carbon atoms per molecule. While the individual block polymer weights are not an essential aspect of the present invention, blocks A will normally have average molecular weights in the order of 5,000 to 100,000, preferably 10,000 to 50,000. The blocks B will usually have average molecular weights in the order of 15,000 to 50,000, usually 35,000 to 150,000. The following species are typical of the block copolymers contemplated, it being stressed that for the sake of simplicity in the following list, only block copolymers having three blocks are specified.

Poly(alpha - methyl styrene)-polyisoprene - poly(alpha-methyl styrene);
Polystyrene-polyisoprene-polystyrene;
Polystyrene-polybutadiene-polystyrene.

In addition to these block copolymers as listed above, partially, i.e., selectively, randomly or completely hydrogenated derivatives thereof may be employed in addition to or in place of a non-hydrogenated species. Preferably, if the polymer is selectively hydrogenated any conjugated diene polymer blocks are hydrogenated while monoalpha-alkenyl arene polymer blocks are essentially unaltered, or at least no more than 25% hydrogenated. The following species typify selectively hydrogenated block compolymers:

Poly(alpha-methyl styrene)-(hydrogenated polyisoprene)-poly(alpha-methyl styrene);
Polystyrene-(hydrogenated polybutadiene)-polystyrene;
Polystyrene-(hydrogenated polyisoprene)-polystyrene.

If the mono-alpha-alkenyl arene polymer blocks are hydrogenated as well as the conjugated diene polymer blocks, the products obtained are typified by the following:

Polyvinyl cyclohexane-(hydrogenated polyisoprene)-polyvinyl cyclohexane;
Polyvinyl cyclohexane - (hydrogenated polybutadiene)-polyvinyl cyclohexane.

Substantially equivalent block copolymers may be prepared or supplied in which hydrogenation steps may be avoided by block polymerizing a mono-alpha-alkenyl arene with one or more alpha monoolefins, for example, hydrogenated polyisoprene blocks are regarded as being substantially equivalent to ethylene-propylene copolymer blocks wherein the ratio of ethylene and propylene are essentially 1:1.

Furthermore, suitable block copolymers may be employed wherein the order to blocks A and B are reversed from that given in the general formula set hereinabove so that the blocks A are "interior" blocks and the blocks B either hydrogenated or non-hydrogenated are end blocks. The generic formulae for such alternatives are as follows:

$$B-A-(B)_x \quad B-A-(A-B)_y \quad \text{and} \quad B-(A-B)_y$$

wherein $x$ and $y$ are as previously described.

Typical properties of the block copolymers are found in Table II below:

TABLE II

| Block copolymer compound | Block polymer [1] | Mol. wt. ×10⁻³ | Block polymer | Percent Oil | Percent Polystyrene | Percent Filler |
|---|---|---|---|---|---|---|
| 1 | SIS | 10-125-10 | 100 | | | |
| 2 | SBS | 14-57-14 | 46 | 32 | 15 | 7 |
| 3 | SBS | 14-57-14 | 65 | 35 | | |
| 4 | SBS | 9.5-51.5-9.5 | 100 | | | |
| 5 | SBS | 14-65-14 | 100 | | | |
| 6 | SBS | 22-48-22 | 65 | 35 | | |
| 7 | SBS | 20-103-20 | 83 | 17 | | |
| 8 | SBS | 14-57-14 | 69 | 31 | | |

[1] S=polystyrene; I=polyisoprene; B=polybutadiene.

The weight ratio of ethylene-vinyl acetate copolymer to polyvinyl chloride, polystyrene or block copolymer may vary from about 1:9 to 9:1 with ranges of from about 1:4 to 4:1 being preferred.

The amount of phosphate biocide can vary within broad ranges, i.e., from 5 to 75% by weight of the total composition with ranges of 10 to 35% by weight being preferred.

The composition, moreover, may contain fillers, oils, dyes, anti-oxidants, stabilizers, plasticizers, perfumes or deodorants.

Generally speaking, the carrier or polymer matrix is heterogeneous; the phosphate biocide being less soluble in the ethylene-vinyl acetate copolymer than in the other polymers.

The compositions according to the invention may be prepared by mechanical mixing of the biocide in the thermoplastic carrier mixture. The mixing may be carried out by tumbling thermoplastic granules and liquid biocide at room temperature or at a higher temperature.

The compositions may be molded, extruded or otherwise formed into articles, such as strips, sheets, rods, granules or foams at a temperature of about 80° C. or higher.

The compositions according to the invention act as generators for the vapor-phase biocides such as dimethyl-2,2-dichlorovinyl phosphate (DDVP). Because of its high vapor pressure ($1.2 \times 10^{-2}$ mm. Hg at 20° C.), DDVP evaporates from the surface of the composition into the surrounding atmosphere. Since DDVP is highly active insecticidally in the vapor phase, only small amounts need to be released to render the compositions highly active. For example, a concentration of 0.02–0.04 micrograms of DDVP per litre in the air is lethal to insects, such as mosquitoes. The compositions serve as long-lived continuous generators of fresh unhydrolyzed biocide even under conditions of highly humidity. The compositions according to the invention have a very good exhaustion, compared with the release of biocide in the individual polymers. Depending upon the carrier material, the exhaustion ranges from 75 to practically 100% of its original quantity of biocide. The compositions are effectively used in houses, stores, stables, factories, etc. They are also suitable for use as animal collars and animal health compounds.

The carrier material is built up from an ethylene-vinyl acetate copolymer and another polymer as designated above. However, the carrier may also be built up of more than two polymers. In other words a combination of polyvinyl acetate, polystyrene and block copolymer may be used.

Generally, a copolymer may for this purpose be considered a polymer, if a copolymer is built up of alternate or randomly distributed units of monomers. Quite different from the above-disclosed copolymers are the block copolymers, as these contain long chains of the same units, which are situated in the molecule in blocks, such as, for example, styrene-butadiene-styrene block copolymers or styrene-isoprene-styrene block copolymers. In this case a block copolymer may be considered for the purpose of the invention as if the carrier is built up of two polymers.

The following examples are illustrative of the invention.

EXAMPLE I

Polymers or copolymers were mixed between two rolls, the softer material being added to the harder material. Mixing was carried out for ten minutes at a temperature of:

150° C. for polystyrene-ethylene-vinylacetate copolymer [1]
150° C. for polyvinyl chloride [2]-ethylene-vinylaceate copolymer.

The sheets obtained were granulated to particles of 2 to 4 millimeters diameter and drenched in dimethyl-2,2-dichlorovinyl phosphate (DDVP). Drenching was carried out by tumbling of granules and liquid DDVP for 24

---

[1] The ethylene-vinylacetate copolymer contained 34% by weight of vinyl-acetate and had a melt index condition E, ASTM D 1238–65T of 6 g./10 min.
[2] Polyvinyl chloride contained 100 parts by weight of PVC; 40 parts by weight of dioctyladipate; 5 parts by weight of Ba-Cd-stearate; 2.5 parts by weight of org. phosphite.

hours at room temperature. A dry granulate containing 20% by weight of DDVP was obtained.

The dry granulate was homogenized in a masticator for 12 minutes at a temperature 20° C. below the above-mentioned rolling temperature.

Strips were then made by compression molding. A mold at a temperature of 100° C. and under pressure was used and the mold was cooled before opening.

The compression-molded strips (25 x 6.4 x 0.6 cm.) had a total weight of about 100 grams and contained 20% by weight of DDVP.

The release rate of the samples was determined by weight loss measurements. The samples were freely suspended in a metal cabinet of 1.4 x 1.7 meters cross-section and 1 meter height (volume about 2 cubic meters). An air stream, evenly distributed over the horizontal cross-section of this cabinet, was let in at the top of the cabinet and discharged at the bottom. The air stream consisted of fresh air, conditioned to a temperature of 23±1° C. and a relative humidity of 60±5%. The volume of air which was passed through the cabinet amounted to 1500 cubic meters per hour.

The E and CW values for the different strips are given below in Table III. The strips were exposed for 90 days.

TABLE III

| Composition | 1 | 2 | 3 | 4 | 5 |
|---|---|---|---|---|---|
| Polystyrene | ¹40 | | 80 | | |
| Polycarbonate | | | | | |
| Ethylene-vinylacetate cop | 40 | 40 | | 80 | |
| Polyvinyl chloride | | 40 | | | 80 |
| DDVP | 20 | 20 | 20 | 20 | 20 |
| E | 16 | 6 | 18 | 28 | 11 |
| CW (in grams) | 20 | 20 | 2 | 13 | 13 |

¹ Polystyrene-oil (2:1).

The results show that the combination of polymers resulted in nearly complete exhaustion of the DDVP therefrom whereas the single polymer matrix showed CW's which were much lower. Moreover, the exponentiality (E) of the combined polymer system was lower as compared to the single polymer generators based on polystyrene and ethylene-vinyl acetate.

EXAMPLE II

Styrene-butadiene-styrene (S-B-S) block copolymer and ethylene-vinylacetate copolymer were mixed between two rolls. Mixing was carried out for ten minutes at a temperature of 160° C.

The S-B-S block copolymer had the following composition:

| | P. wt. |
|---|---|
| S-B-S 22,000–44,000–22,000 | 100 |
| Naphthenic oil | 20 |
| Inorganic filler | 10 |
| Anti-oxidant | 0.5 |

The ethylene-vinylacetate copolymer contained 34% wt. vinylacetate and had a melt index of 6 g./10 min. (Condition E, ASTM D 1238-65T).

The sheets obtained were granulated to particles of 2 to 4 millimeters diameter and drenched in DDVP. Drenching was carried out by tumbling of granules and liquid DDVP for 24 hours at room temperature. A dry granulate containing 20% wt. of DDVP was obtained.

The dry granulate was homogenized in a masticator for 12 minutes at a temperature of 140° C.

Strips were then made by compression molding. A mold at a temperature of 100° C. and under pressure was used. The compression-molded strips (thickness 1 cm.) had a total weight of about 100 grams and contained 20% wt. DDVP.

The release rate of the sample was determined by weight loss measurements. The samples were freely suspended in a metal cabinet of 1.4 x 1.7 meters cross-section and 1 meter height (volume about 2 cubic meters). An air stream, evenly distributed over the horizontal cross-section of this cabinet, was let in at the top of the cabinet and discharged at the bottom. The air stream consisted of fresh air, conditioned to a temperature of 23±1° C. and a relative humidity of 60±5%. The volume of air which was passed through the cabinet amounted to 1500 cubic meters per hour.

The S-B-S/ethylene-vinylacetate copolymer as carrier is compared with S-B-S (containing naphthenic oil, inorganic filler and anti-oxidant as mentioned above) and with ethylene-vinylacetate copolymer in Table IV.

TABLE IV

| Composition | 1 | 2 | 3 |
|---|---|---|---|
| S-B-S | 80 | | 40 |
| Ethylene-vinylacetate copolymer | | 80 | 40 |
| DDVP | 20 | 20 | 20 |
| E | 20 | 14 | 10 |
| CW (in grams) | 15 | 10 | 15 |

Again, the results show the combined polymer system had a lower E than the single polymers and the CW was greater than ethylene-vinyl acetate alone and equal to the CW for S-B-S copolymer alone.

EXAMPLE III

Strips containing a mixture of S-B-S block copolymer and ethylene-vinylacetate copolymer as carried were extruded.

The S-B-S block copolymer was compounded as in Example II and the ethylene-vinylacetate copolymer contained 34% wt. of vinylacetate and had a melt index of 6 g./10 min. The composition varied in ethylene-vinylacetate copolymer content.

The strips (thickness 0.5 cm.) were exposed for 50 days. The results are given in Table V.

TABLE V

| Composition | 1 | 2 | 3 | 4 | 5 |
|---|---|---|---|---|---|
| S-B-S | 80 | 60 | 40 | 20 | |
| Ethylene-vinylacetate copolymer | | 20 | 40 | 60 | 80 |
| DDVP | 20 | 20 | 20 | 20 | 20 |
| E | 4 | 3 | 3 | 4 | 7 |
| CW | 16 | 18 | 18 | 18 | 14 |

These results show that the combined polymer resulted in generators having a lower E and higher CW than either of the polylmers when used separately.

EXAMPLE IV

In the same manner as disclosed in Example II, strips containing a mixture of S-B-S block copolymer with different grades of ethylene-vinylacetate copolymer were made and tested.

The S-B-S block copolymer was compounded as in Example II.

The vinylacetate content in the ethylene-vinylacetate copolymer was 34%, 27% and 19% by weight of said copolymer, respectively.

The strip weight was about 100 grams, thickness 2 cm., exposure 90 days.

| Composition | 1 | 2 | 3 | 4 | 5 | 6 | 7 |
|---|---|---|---|---|---|---|---|
| S-B-S | 80 | 40 | 40 | 40 | | | |
| EVA 34 percent | | 40 | | | 80 | | |
| EVA 27 percent | | | 40 | | | 80 | |
| EVA 19 percent | | | | 40 | | | 80 |
| DDVP | 20 | 20 | 20 | 20 | 20 | 20 | 20 |
| E | 16 | 7 | 10 | 16 | 9 | 14 | 30 |
| CW | 10 | 11 | 10 | 6 | 7 | 6 | 3 |

These results show that the combined polymers showed a lower E and a higher CW than did the ethylene-vinyl acetate copolymer alone. Also, with the exception of composition 4 the E was lower and the CW equal to or greater than the results of using the S-B-S block copolymer alone.

I claim as my invention:

1. A solid biocidal composition comprising an effective amount of from 10 to 35% by weight of the total composition of a volatile phosphate biocide of the formula

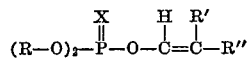

wherein R is methyl or ethyl, X is O or S, R' is hydrogen or halogen and R" is halogen dispersed in a polymer mixture of an ethylene-vinylacetate copolymer of the formula

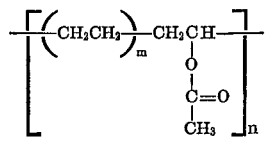

wherein $m$ is an integer from 1 to 30 and $n$ is an integer from 15 to 250 and a polymer selected from the group consisting of polyvinyl chloride, polystyrene and a block copolymer having a general formula selected from the group consisting of

and hydrogenated derivatives of said block copolymers wherein A is a polymer block of styrene or alpha-methyl styrene having a molecular weight of from 5,000 to 100,000, and B is a polymer block of butadiene or isoprene having a molecular weight of 15,000 to 500,000, $x$ is 0 or 1 and $y$ is an integer of 2 to 5 wherein the weight ratio of ethylene-vinylacetate copolymer to the other polymer is 1:9 to 9:1 said composition being useful for controlling invertebrate pests.

2. A biocidal composition according to claim 1 wherein R is methyl, X is O, and R' and R" are chlorine.

3. A biocidal composition according to claim 2 wherein the polymer mixture is a mixture of ethylene-vinylacetate copolymer and polyvinyl chloride.

4. A biocidal composition according to claim 2 wherein the polymer mixture is a mixture of ethylene-vinylacetate copolymer and polystyrene.

5. A biocidal composition according to claim 2 wherein the polymer mixture is a mixture of ethylene-vinylacetate copolyme rand a block copolymer.

6. A biocidal composition according to claim 5 wherein A is polystyrene and B is polybutadiene.

7. A method controlling invertebrate pests which comprises subjecting said pests to a pesticidally effective amount of the composition of claim 1.

References Cited
UNITED STATES PATENTS 3,318,769   5/1967   Folckemer _____ 424—83
3,228,830   1/1966   McFadden et al. _____ 424—83

OTHER REFERENCES

Chemical Abstracts, vol. 48, Oct. 27, 1953, p. 4884h.

SAM ROSEN, Primary Examiner
V. D. TURNER, Assistant Examiner

U.S. Cl. X.R.
424—19, 83, 219